(12) United States Patent
Jawidzik et al.

(10) Patent No.: US 11,274,787 B2
(45) Date of Patent: Mar. 15, 2022

(54) STOPPING ELEMENT FOR LIMITING ROTATIONAL RANGE OF A ROTATING PART

(71) Applicant: Alcon Inc., Fribourg (CH)

(72) Inventors: Geoffrey C. Jawidzik, Mission Viejo, CA (US); Brody Wayne Collins, Tustin, CA (US)

(73) Assignee: Alcon Inc., Fribourg (CH)

( * ) Notice: Subject to any disclaimer, the term of this patent is extended or adjusted under 35 U.S.C. 154(b) by 17 days.

(21) Appl. No.: 16/883,084

(22) Filed: May 26, 2020

(65) Prior Publication Data
US 2020/0378550 A1 Dec. 3, 2020

Related U.S. Application Data

(60) Provisional application No. 62/854,370, filed on May 30, 2019.

(51) Int. Cl.
*F16M 11/12* (2006.01)
*F16M 11/42* (2006.01)

(52) U.S. Cl.
CPC .......... *F16M 11/126* (2013.01); *F16M 11/42* (2013.01); *F16M 2200/024* (2013.01)

(58) Field of Classification Search
CPC ............... F16M 11/126; F16M 11/42; F16M 2200/024; F16M 11/2014; F16M 11/10
USPC ...................... 248/371, 346, 349.1, 415, 418
See application file for complete search history.

(56) References Cited

U.S. PATENT DOCUMENTS

| 4,365,779 | A | 12/1982 | Bates | |
|---|---|---|---|---|
| 4,570,892 | A | 2/1986 | Czech | |
| D282,847 | S | 3/1986 | Hettinga | |
| 4,807,842 | A | 2/1989 | Freni, Jr | |
| 5,024,415 | A * | 6/1991 | Purens | F16M 11/126 248/349.1 |
| 5,589,849 | A | 12/1996 | Ditzik | |
| 6,334,599 | B1 * | 1/2002 | Jeong | F16M 11/08 248/371 |
| 6,510,049 | B2 | 1/2003 | Rosen | |
| 6,585,201 | B1 | 7/2003 | Reed | |
| 6,801,426 | B2 | 10/2004 | Ichimura | |
| 7,226,028 | B2 | 6/2007 | Lin | |
| 7,644,897 | B2 | 1/2010 | Shin | |

(Continued)

FOREIGN PATENT DOCUMENTS

KR 20070045006 A 5/2007

*Primary Examiner* — Muhammad Ijaz

(57) ABSTRACT

Certain embodiments provide a rotational mechanism comprising a rotating part with an extension, configured to rotate about a first axis, a base comprising a sliding channel, wherein the rotating part is configured to rotate with respect to the base, and a stopping element comprising a stopping tab configured to interact with the sliding channel and further configured to interact with the extension to limit rotation of the rotating part. The rotating part is able to rotate the same amount in both the first direction and the second direction starting from a starting position and stopping at a stopping position, wherein, when reaching the stopping position by rotation in the first direction, the rotating part is restricted from further moving in the first direction, and wherein, when reaching the stopping position by rotation in the second direction, the rotating part is restricted from further moving in the second direction.

17 Claims, 10 Drawing Sheets

(56) References Cited

U.S. PATENT DOCUMENTS

| | | |
|---|---|---|
| 7,764,491 B2 | 7/2010 | Zhao |
| 8,390,716 B2 | 3/2013 | Maekawa |
| 8,496,218 B2 | 7/2013 | Ochoa |
| 8,570,723 B2 | 10/2013 | Myerchin |
| 8,628,052 B2* | 1/2014 | Lee .................. F16M 11/08 |
| | | 248/289.11 |
| 9,413,961 B2 | 8/2016 | Welsh |
| 2004/0178314 A1* | 9/2004 | Chen .................. F16M 11/24 |
| | | 248/349.1 |
| 2008/0029668 A1 | 2/2008 | Tsuo |
| 2008/0100997 A1* | 5/2008 | Chen .................. G06F 1/1601 |
| | | 361/679.01 |
| 2008/0141489 A1 | 6/2008 | Hsu |
| 2010/0149439 A1 | 6/2010 | Chiba |
| 2012/0327566 A1 | 12/2012 | Pennington, Jr. |
| 2014/0334082 A1 | 11/2014 | Wang |
| 2016/0102802 A1* | 4/2016 | Oginski ............... F16M 13/027 |
| | | 248/418 |

* cited by examiner

STOPPING ELEMENT FOR LIMITING ROTATIONAL RANGE OF A ROTATING PART

PRIORITY CLAIM

This application claims the benefit of priority of U.S. Provisional Patent Application Ser. No. 62/854,370 titled "STOPPING ELEMENT FOR LIMITING ROTATIONAL RANGE OF A ROTATING PART," filed on May 30, 2019, whose inventors are Geoffrey C. Jawidzik and Brody Wayne Collins, which is hereby incorporated by reference in its entirety as though fully and completely set forth herein.

TECHNICAL FIELD

The present disclosure relates generally to a stopping element for limiting the rotational range of a rotating part.

BACKGROUND

Rotatable display monitors are used in conjunction with a variety of consumer electronics and commercial equipment. One prevalent use of rotatable display monitors is in medical consoles. Providing a rotatable display monitor on a medical console is advantageous because it enables a user, such as a medical technician, surgeon, nurse, etc., to view and/or interact with the display monitor's screen from different angles and locations within a certain environment around the console. Generally, a number of different cables and cords, such as power cords, connect to a display monitor through a hollow shaft in the console. The rotation of the display monitor has to be limited in order avoid twisting and rotating the cables and cords beyond a certain point and causing damage. As such, certain existing rotational mechanisms are used to allow a display monitor to rotate while limiting its rotation to a certain degree. However, such existing rotational mechanisms, in some cases, may not be easy to use.

BRIEF SUMMARY

The present disclosure relates generally to a stopping element for limiting the rotational range of a rotating part.

Certain embodiments provide a rotational mechanism comprising a rotating part configured to rotate about a first axis, the rotating part comprising an extension, a base comprising a sliding channel, wherein the rotating part is configured to rotate with respect to the base, and a stopping element comprising a stopping tab configured to move within and interact with the sliding channel and further configured to interact with the extension to limit rotation of the rotating part. The sliding channel comprises a first barrier and a second barrier. The first barrier restricts movement of the stopping element in a first direction based on interaction between the first barrier and the stopping tab. The second barrier restricts movement of the stopping element in a second direction based on interaction between the second barrier and the stopping tab. The rotating part is able to rotate the same amount in both the first direction and the second direction starting from a starting position and stopping at a stopping position, wherein, when reaching the stopping position by rotation in the first direction, the rotating part is restricted from further moving in the first direction, and wherein, when reaching the stopping position by rotation in the second direction, the rotating part is restricted from further moving in the second direction.

Certain embodiments provide a surgical console comprising a display monitor and rotating part configured to rotate about a first axis. The rotating part comprising an extension, wherein the display monitor is coupled to the rotating part. The surgical console further comprises a base comprising a sliding channel, wherein the rotating part is configured to rotate with respect to the base, and a stopping element comprising a stopping tab configured to move within and interact with the sliding channel and further configured to interact with the extension to limit rotation of the rotating part. The sliding channel comprises a first barrier and a second barrier. The first barrier restricts movement of the stopping element in a first direction based on interaction between the first barrier and the stopping tab. The second barrier restricts movement of the stopping element in a second direction based on interaction between the second barrier and the stopping tab. The rotating part is able to rotate the same amount in both the first direction and the second direction starting from a starting position and stopping at a stopping position, wherein, when reaching the stopping position by rotation in the first direction, the rotating part is restricted from further moving in the first direction, and wherein, when reaching the stopping position by rotation in the second direction, the rotating part is restricted from further moving in the second direction.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with various other embodiments discussed herein. In similar fashion, while exemplary embodiments may be discussed below as device, instrument, or method embodiments it should be understood that such exemplary embodiments can be implemented in various devices, instruments, and methods.

Aspects of the present disclosure provide a rotational mechanism that allows a rotating part (e.g., a monitor) to rotate around an axis by 180 degrees from both directions. In certain aspects, a movable stopping element is used to ensure that the rotating part's rotation is limited to 180 degrees in either direction from the starting position. In certain other aspects, multiple movable stopping elements are used to allow the rotating part to rotate more than 180 degrees from the starting point before it reaches a stopping or stowing position.

FIGS. 1A-1D each illustrate a medical console 100 implementing an example prior art rotational mechanism for rotating and stowing display monitor ("monitor") 102. Each of FIGS. 1A-1D illustrates monitor 102 in a different rotational state. To clearly describe the rotational state of monitor 102 in each figure, three axes X, Y, and Z are used as illustrated. A vertical plane that is co-planar and parallel to a screen that displays visual content of monitor 102 is referred to herein as a frontal plane 104. Also, in each figure, a direction that monitor 102's frontal plane 104 faces, which corresponds to the direction the screen faces and is perpendicular to frontal plane 104, is illustrated using a frontal plane arrow 105. In certain aspects of the figures, only a frontal plane arrow, and not a frontal plane itself, is shown. The frontal plane arrow 105 corresponds to the direction that frontal plane 104 faces. The angle of rotation of monitor 102 around the Z axis is referred to and shown as $\Theta$ and is described as measured with respect to the frontal plane arrow 105. Also, the angle of rotation of monitor 102 around the Y axis is referred to and shown as a.

Figure 1A:
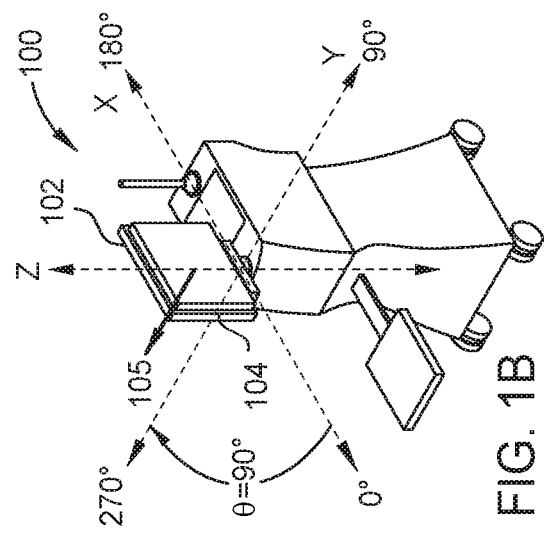
FIGS. 1A-1D each illustrate a medical console implementing an example prior art rotational mechanism for rotating and stowing a display monitor ("monitor").
Figure 1B:
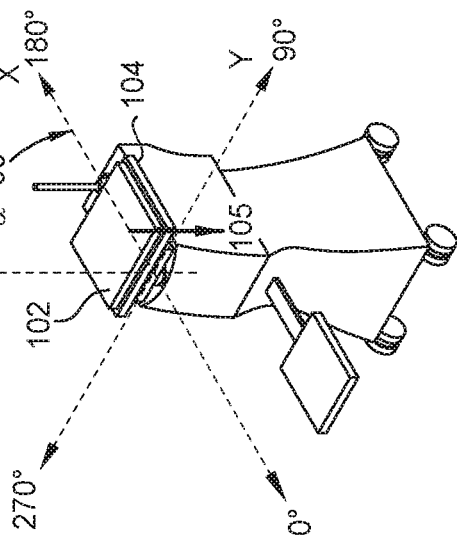

FIG. 1A illustrates frontal plane 104 of monitor 102 at zero degrees rotation about the Z axis ($\Theta$ =0 degrees on the X axis), which corresponds to frontal plane arrow 105 being at zero degrees rotation, aligned with the X axis. The rotational position of monitor 102 in FIG. 1A is illustrative of the state that monitor 102 is mostly in during the use of monitor 102 by a user. This rotational position, in which frontal plane 104 of monitor 102 is at zero degrees on the X axis, is referred to hereinafter as the starting position. The prior art rotational mechanism used in conjunction with console 100 limits the rotation of monitor 102 around the Z axis by 180 degrees to only one direction. For example, as shown in FIG. 1B, the rotation of monitor 102 is limited to 90 degrees when monitor 102 is rotated in a clockwise direction from the starting position. A stationary stopping element (e.g., a pin) may be used to limit the rotation of monitor 102 to 90 degrees in a clockwise direction in that example.

Figure 1C:
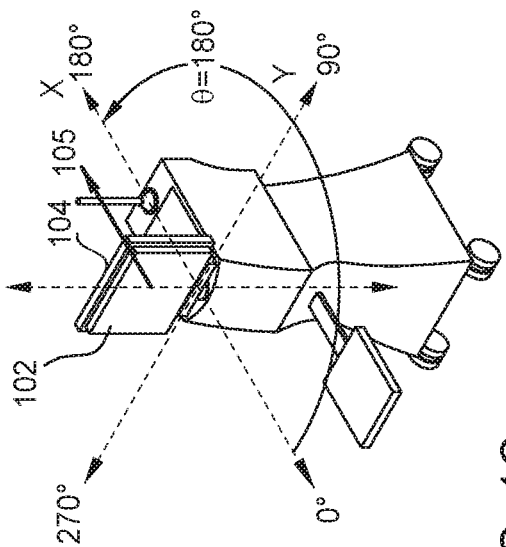
Figure 1D:
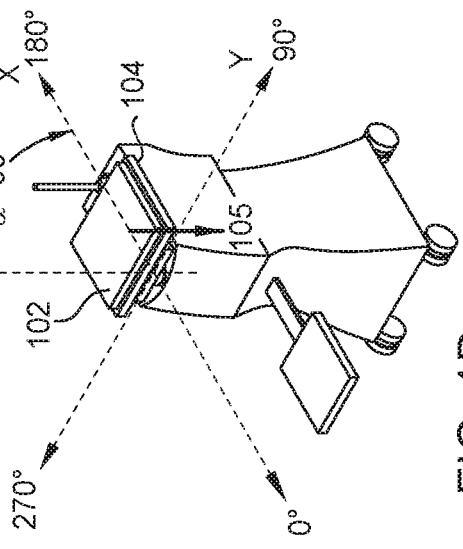

Unlike the clockwise direction, in the counterclockwise direction, the prior art rotational mechanism allows monitor 102 to be rotated a full 180 degrees from the starting position. For example, FIG. 1C shows monitor 102, which has been rotated in a counterclockwise direction by 180 degrees. Upon rotating monitor 102 by 180 degrees counterclockwise, as shown in FIG. 1C, another stationary stopping element may be used to prohibit further rotation of monitor 102 in the same direction. The stationary stopping element may be a fixed pin, in one example. Once frontal plane arrow 105 is set to 180 degrees (i.e., stowing position), as shown in FIG. 1C, the prior art rotational mechanism is configured to allow monitor 102 to be stowed. FIG. 1D shows monitor 102, which has rotated by 90 degrees around the Y ($\alpha$=90) axis and has been stowed. In the stowed position, frontal plane 104 is parallel with the XY plane.

Figure 2:
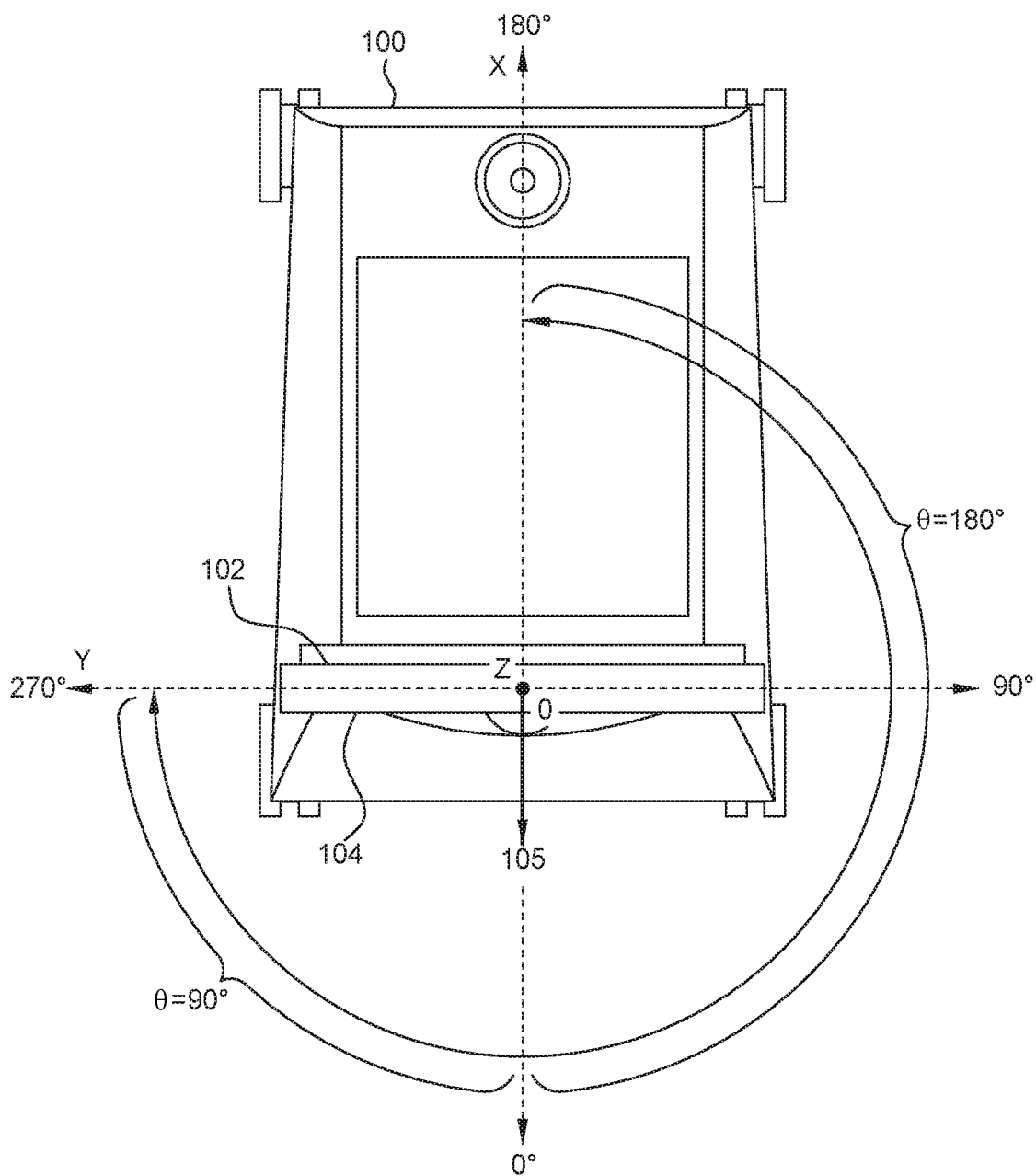
FIG. 2 illustrates the rotational freedom of the monitor of FIGS. 1A-1D from the top.

FIG. 2 illustrates monitor 102's rotational freedom provided by the prior art rotational mechanism from the top. As shown, monitor 102, which is at the starting position, may be rotated counterclockwise by 180 degrees, which puts monitor 102 in a stowing position. Monitor 102 may also be rotated clockwise by 90 degrees, in which case frontal plane arrow 105 would be in a position that is the same as a 270 degree rotation counterclockwise. However, using a rotation mechanism that allows a user to rotate monitor 102 by 180 degrees in one direction (e.g., counterclockwise) and not the other direction (e.g., clockwise) may be counter intuitive.

Accordingly, certain embodiments described herein provide a rotational mechanism that allows a rotating part (e.g., a monitor) to rotate around an axis by 180 degrees in both directions, i.e., clockwise and counterclockwise. In certain aspects, a movable stopping element is used to ensure that the rotating part's rotation is limited to 180 degrees in both directions from the starting position (e.g., FIGS. 3-9 and 11-13). In certain other aspects, multiple movable stopping elements are used to allow the rotating part to rotate more than 180 degrees from the starting point before it reaches a stopping or stowing position (e.g., FIG. 10).

Figure 3A:
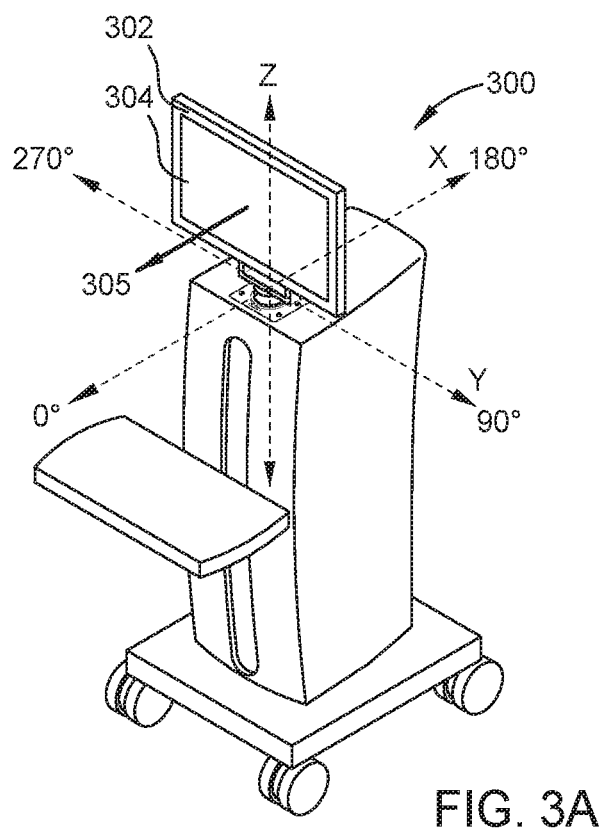
FIGS. 3A-3C each illustrate a medical console implementing an example rotational mechanism for rotating and stowing a monitor, in accordance with certain embodiments.

FIG. 3A illustrates console 300 utilizing the rotational mechanism described herein to allow monitor 302 to rotate by 180 degrees around the Z axis from the starting position in both directions.

Figure 3B:
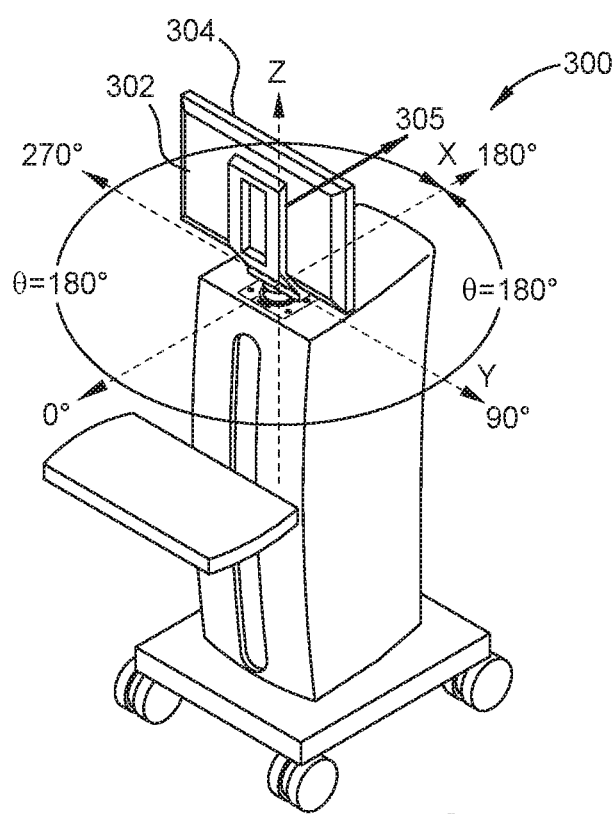

FIG. 3B illustrates monitor 302's ability to rotate by 180 degrees around the Z axis in both clockwise and counterclockwise directions from the starting position, which, as discussed, corresponds to frontal plane arrow 305 of monitor 302 being set to zero degrees about the Z axis (or aligned with the X axis). After a 180 degree rotation from the starting position, as shown in FIG. 3B, frontal plane arrow 305 is set to 180 degrees aligned with the X axis in the opposite direction. Once the monitor has rotated by 180 degrees, any further rotation of monitor 302 is restricted by a movable (e.g., sliding) stopping element, described in further detail below. The movable stopping element limits the rotation of monitor 302 to 180 degrees from the starting position in both directions. Accordingly, monitor 302 can be rotated by 180 degrees from the starting position in both directions. Once monitor 302 has been rotated by 180 degrees from the starting position, in either direction, movable stopping element limits any further rotation of monitor 302, in certain embodiments. In other words, the movable stopping element allows monitor 302 to be placed in the stowing position in both clockwise and counterclockwise directions. By limiting monitor 302's rotation to 180 degrees in each direction, the rotational mechanism described herein also helps ensure that the cables and cords connected to monitor 302, through a shaft, are not excessively twisted and rotated as to be damaged.

Figure 3C:
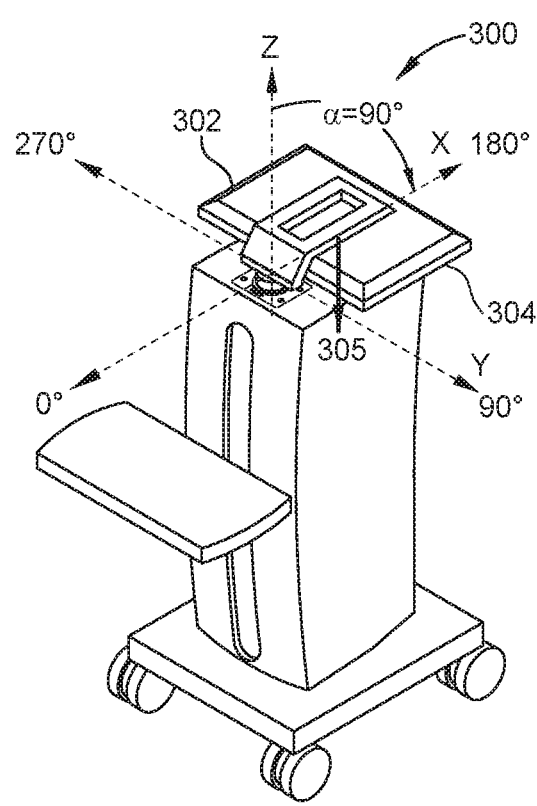

Note that, in one example, when frontal plane arrow 305 is set to 180 degrees about the Z axis (or 180 degrees plus multiples of 360 degrees, or −180 degrees, or −180 degrees minus multiples of 360 degrees), monitor 302 (which may be mounted on a rotating part or itself be referred to herein as a rotating part) may be referred to as being in a stowing position. The stowing position may also be referred to as a stopping position or full rotation position (e.g., in cases where rotating part is not associated with a device, such as a monitor, that needs to be stowed in the stowing position). FIG. 3C illustrates monitor 302 being stowed after frontal plane arrow 305 is set to 180 degrees on the X axis. Similar to the prior art rotational mechanism described in relation to FIGS. 1 and 2, in certain embodiments, the rotational mechanism described herein only allows monitor 302 to be stowed when frontal plane arrow 305 is set to 180 degrees on the X axis. Hereinafter, the stowing position of monitor 302 refers to frontal plane arrow 305 being set to 180 degrees on the X axis.

Figure 4:
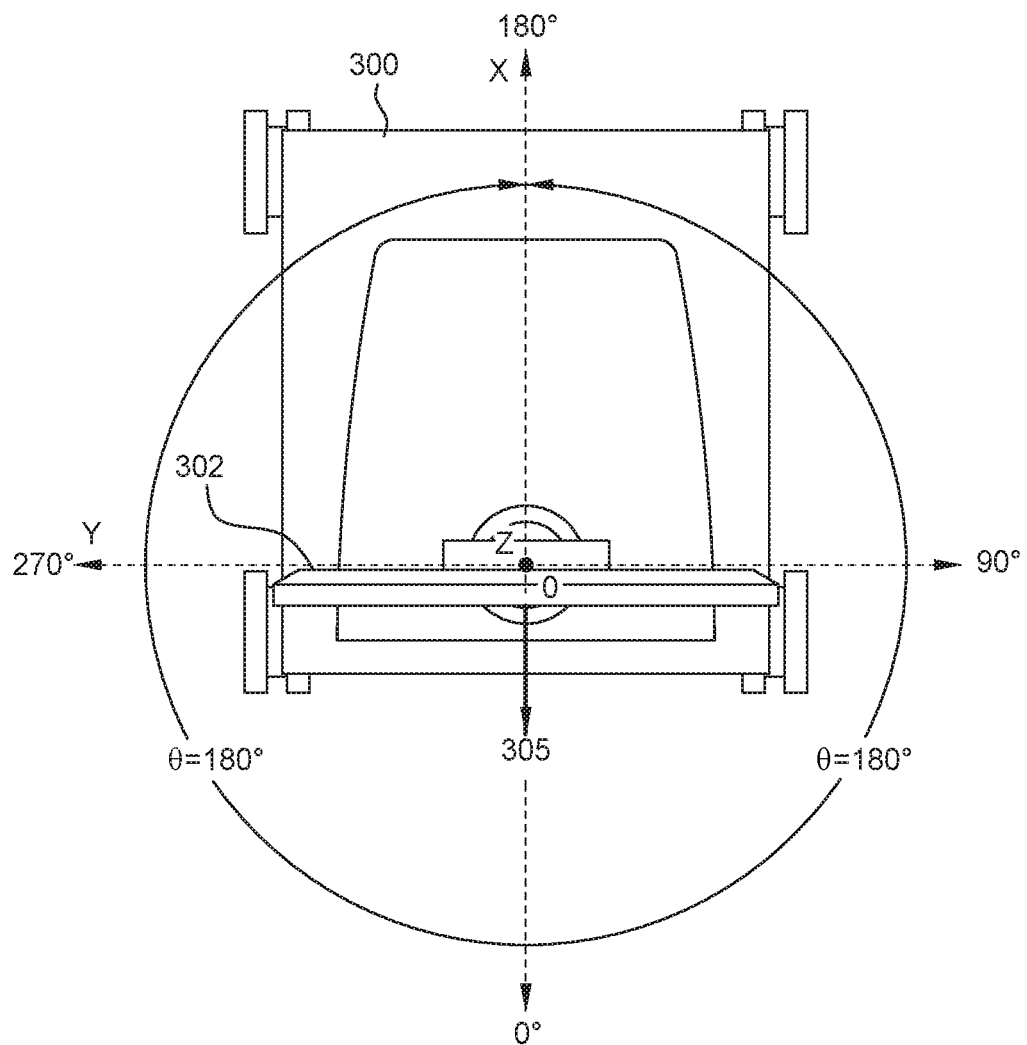
FIG. 4 illustrates the rotational freedom of the monitor of FIGS. 3A-3C from the top, in accordance with certain embodiments.

FIG. 4 illustrates monitor 302's rotational freedom provided by the rotational mechanism described herein from the top. As shown, monitor 302, whose frontal plane arrow 305 is at zero degrees, may be rotated clockwise and counterclockwise by $\Theta$ =180 degrees until it reaches the stowing position. As such, the rotational mechanism described herein may provide a better user experience to the user of console 300 in comparison with console 100.

FIGS. 5-8 illustrate example components that enable the rotational mechanism described in relation to FIGS. 3 and 4.

Figure 5:
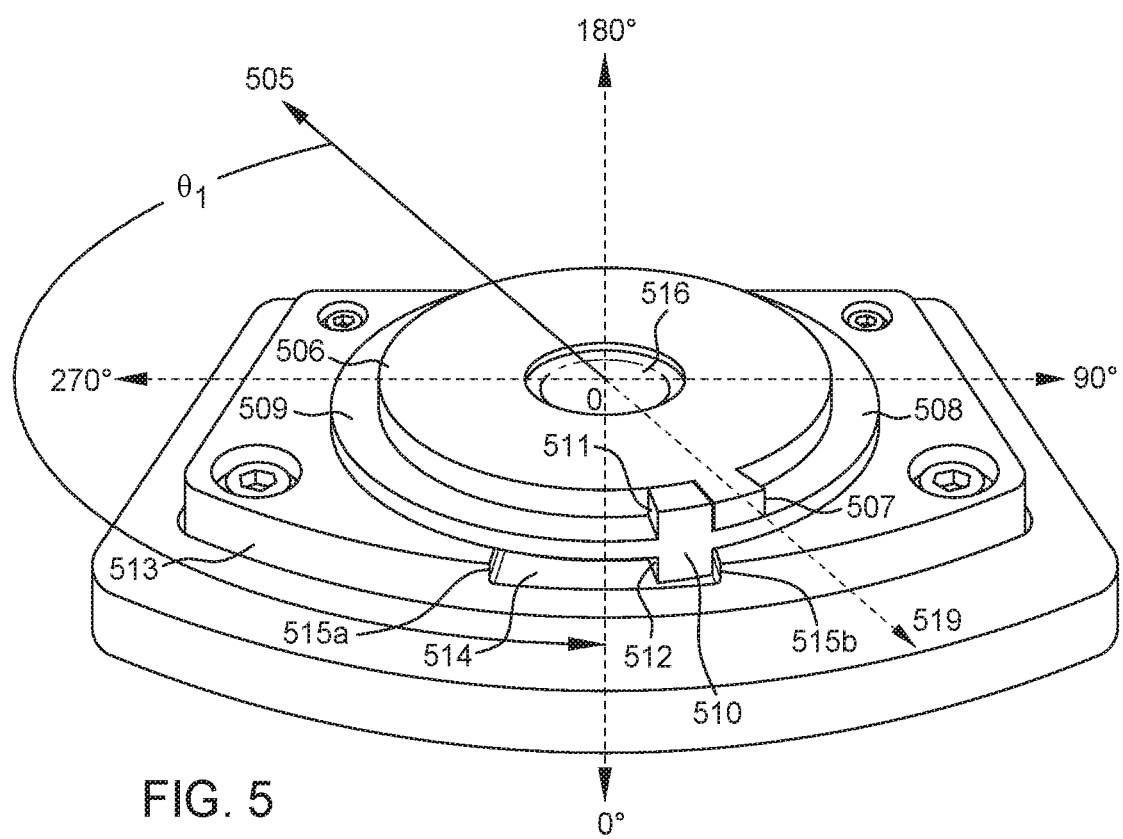
FIG. 5 illustrates a rotating part, stopping element, and a base having a sliding channel, in accordance with certain embodiments.

FIG. 5 illustrates a rotating part 506, stopping element 508, and a base 513 having a sliding channel 514. In the example of FIG. 5, rotating part 506 is a circular part on top of which a device, such as a monitor, may be mounted. Rotating part 506 comprises an extension 507 that is configured to interact with stopping element 508 to limit the bidirectional rotation of rotating part 506 to 180 degrees measured from the starting position. Rotating part 506 has a frontal plane whose angle of rotation is described as measured with respect to a frontal plane arrow 504 that is perpendicular to the frontal plane and also parallel to but in the opposite direction of where the middle of the tip of extension 507 is directed to. The direction of the middle of the tip of extension 507 is shown with extension arrow 509. In certain aspects, extension arrow 509 corresponds to the direction of the dorsal plane of rotating part 506. In the example of FIG. 5 there is a 180 degree difference between frontal plane arrow 504 and extension arrow 505.

The angle of rotation of frontal plane, as measured by frontal plane arrow 505, around the Z axis is referred to as $\Theta$, which is measured based on a coordinate system with an origin (shown as O) at the center of rotating part 506. Although not shown, the Z axis is perpendicular to both the X axis and the Y axis. Note that although rotating part 506 is circular, in other examples, rotating part may have other shapes. Also, although in certain cases a monitor may be mounted on rotating part 506, in other examples, any other component such as an electronic (camera, speaker, light fixture, etc.) or non-electronic component may be mounted on rotating part 506. In yet certain other embodiments, rotating part 506 may itself comprise such components.

Stopping element 508 comprises a ring 509 and a stopping tab 510. Ring 509 has a larger outer diameter as compared to the outer diameter of rotating part 506, except for where extension 507 is provided on rotating part 506. Rotating part 506 and ring 509 are separate components (e.g., not coupled together) that are configured to rotate in relation to each other. In certain aspects, ring 509 is situated around a thrust disk (shown in FIG. 9 as thrust disk 924). A hollow shaft 516 passes through rotating part 506 and ring 509. In certain aspects, shaft 516 houses cables and cords that are configured to connect to the monitor. In certain aspects, shaft 516 is stationary or fixed such that both rotating part 506 and ring 509 rotate in relation to shaft 516. Ring 509 rotates with respect to base 513 and independent of rotating part 506.

Figure 6:
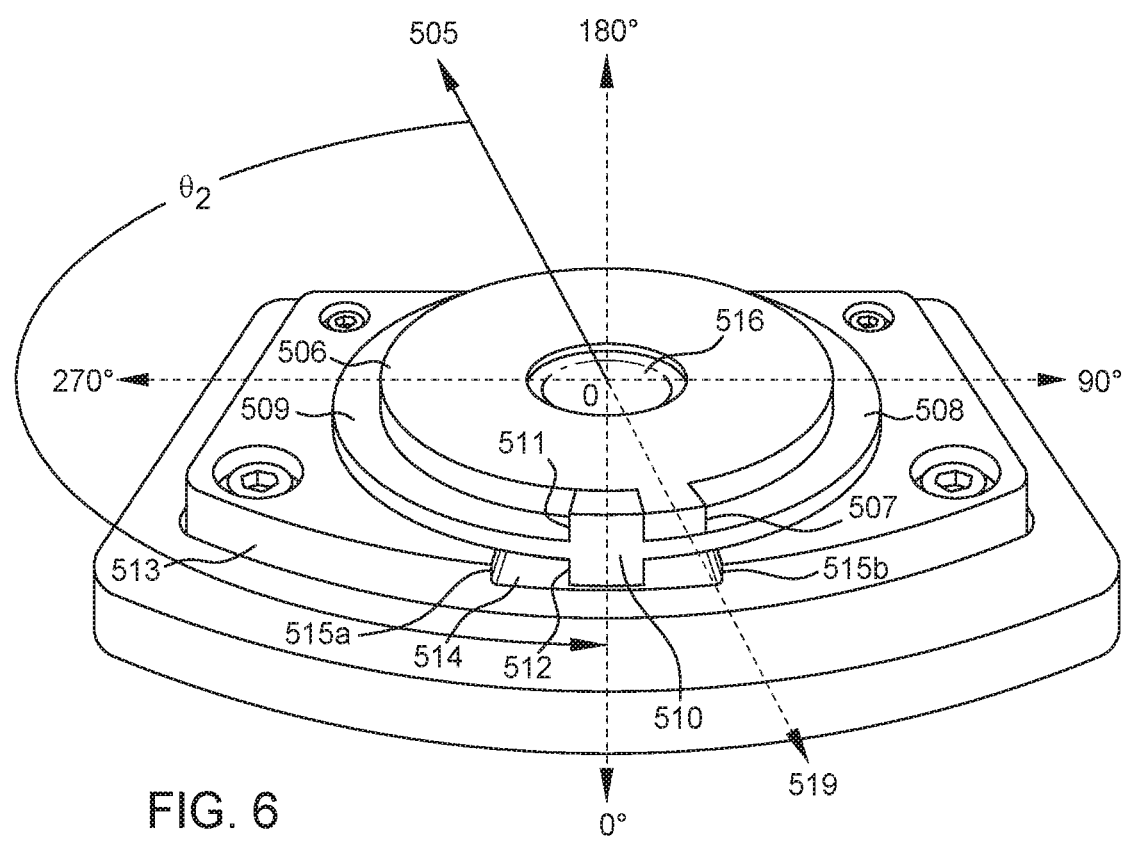
FIG. 6 is illustrative of further rotation of a rotating part and stopping element in a clockwise manner, in accordance with certain embodiments.
Figure 7:
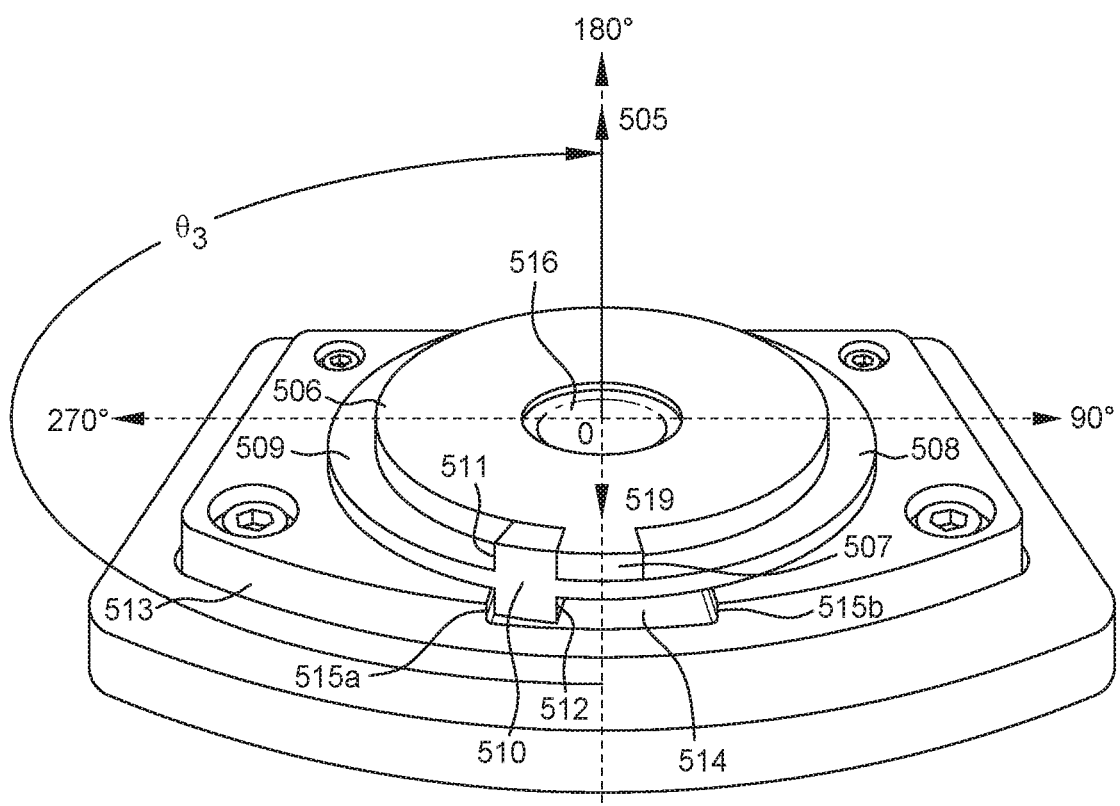
FIG. 7 is illustrative of a full rotation of the rotating part and stopping element of FIG. 6 in a clockwise manner, in accordance with certain embodiments.

As shown, stopping tab 510 comprises an upper segment 511 and a lower segment 512. Upper segment 511 is configured to interact with extension 507 of rotating part 506. Lower segment 512 is configured to move within or slide on sliding channel 514 of base 513. Sliding channel 514 provides a pathway for lower segment 512 to slide clockwise and counterclockwise. Sliding channel 514 also comprises stopping points or barriers 515a and 515b, which limit the movement of lower segment 512 within stopping channel 514. As shown in FIG. 5, rotating part 506 has been rotated clockwise by $\Theta_1$ degrees from the starting position. At $\Theta_1$, which is less than 180 degrees, extension 507 makes contact with upper segment 511 of stopping tab 510. As shown in FIGS. 6 and 7, further clockwise rotation of rotating part 506 causes extension 507 to exert force on upper segment 511, thereby causing a clockwise rotation of stopping element 508, and causing lower segment 512 to slide through channel 514 in a clockwise direction.

FIG. 6 is illustrative of further clockwise rotation of rotating part 506 and stopping element 508. More specifically, FIG. 6 shows rotating part 506, at $\Theta_2$ degrees, as well as stopping tab 510, which has further rotated clockwise. As shown, $\Theta_2$ is less than 180 degrees.

FIG. 7 is illustrative of a full rotation of rotating part 506 and stopping element 508 clockwise. More specifically, FIG. 7 shows rotating part 506 at $\Theta_3$, which equals 180 degrees measured from the starting position. As shown, the length of sliding channel 514, the width of stopping tab 510, and the width of extension 507 are configured such that when rotating part 506 is fully rotated clockwise and stopping tab 510 makes contact with barrier 515a, frontal plane arrow 505 of rotating part 506 is at 180 degrees. In one example, half of the width of extension 507 plus the width of stopping tab 510 equals half of the width of sliding channel 514.

When frontal plane arrow 505 is at 180 degrees, if a monitor is mounted on rotating part 506, the monitor may be allowed to be stowed. From this stowing position, rotating part 506 can be rotated by a full 360 degrees in an opposite direction (counterclockwise).

Figure 8:
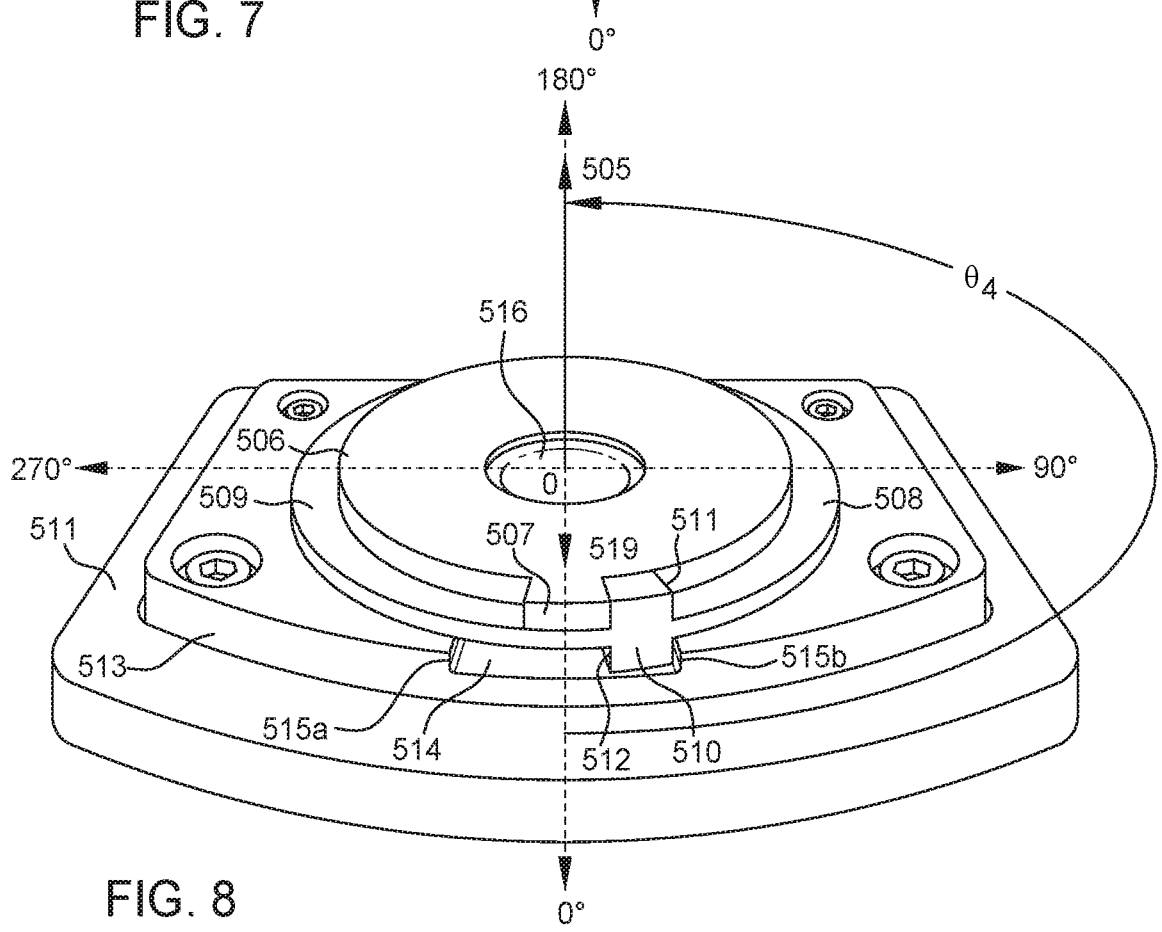
FIG. 8 illustrates the rotating part of FIGS. 6 and 7, at a fully rotated state, in accordance with certain embodiments.

FIG. 8 illustrates rotating part 506, which is fully rotated counterclockwise by $\Theta_4$ from the starting position (or 360 degrees from the stowing position shown in FIG. 7). As shown, any further counterclockwise rotation of rotating part 506 is prevented due to stopping tab 510 making contact with barrier 515b. Accordingly, as shown, from the starting position, the rotational mechanism described herein allows for moving rotating part 506 in both the clockwise and counterclockwise directions up to 180 degrees. Note that both FIG. 7 and FIG. 8 show frontal plane arrow 505 being set to 180 degrees about the Z axis (i.e., frontal plane is set to 180 degrees on the X axis), which puts the monitor in the stowing position. As such, the monitor can be placed in the stowing position both through rotating the monitor by 180 degrees clockwise from the starting position and also through rotating the monitor by 180 degrees counterclockwise from the starting position.

Also, note that in FIGS. 5-8 the frontal plane of rotating part 506 is in the opposite direction of where extension 507 is directed to. More specifically, frontal plane arrow 505 is parallel to but in the opposite direction of extension arrow 519. However, in some other embodiments, frontal plane of rotating part 506 is oriented in the same direction as where extension 507 is directed to. More specifically, in such embodiments, frontal plane arrow 505 is parallel to and unidirectional (i.e., oriented in the same direction) with extension arrow 519, such that there is a 0 degree difference between frontal plane arrow 505 and extension arrow 519. In such embodiments, in the stowing position both frontal plane arrow 505 and extension arrow 519 are set to 0 degrees about the Z axis (0 degrees on the X axis) while in the starting position, both frontal plane arrow 505 and extension arrow 519 are set to 180 degrees about the Z axis (180 degrees on the X axis). In all embodiments of the present disclosure, rotating part 506 is placed in a stowing or stopping position when the middle of the tip of extension 507 is aligned with the middle of sliding channel 514, as shown in FIGS. 7 and 8, such that rotating part 506 is restricted from further rotating in the same direction it has been rotating in order to reach the stopping position.

In some other embodiments, frontal plan arrow 505 may make angles other than 0 or 180 degrees with extension arrow 519. For example, frontal plane arrow 505 may be perpendicular to extension arrow 519.

Figure 9:
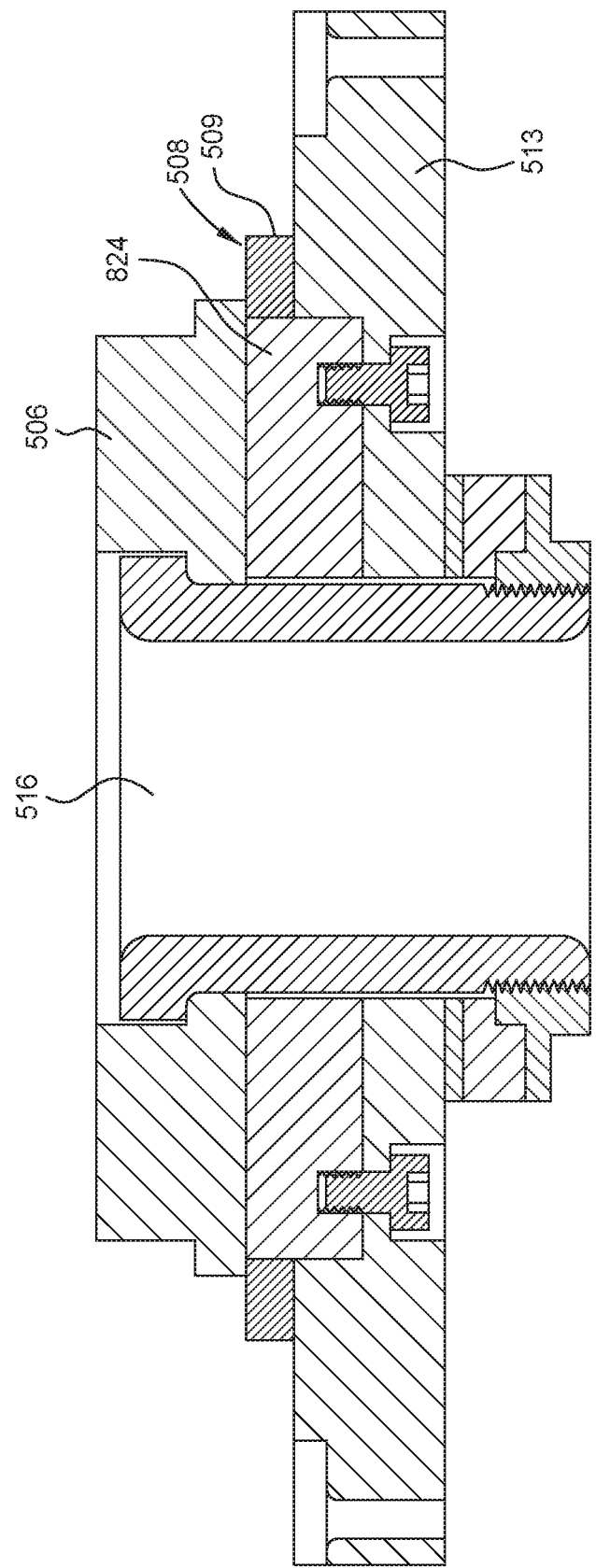
FIG. 9 illustrates a cross-sectional view of the rotating part, stopping element, and base of FIGS. 5-8, in accordance with certain embodiments.

FIG. 9 illustrates a cross-sectional view of the rotating part 506, stopping element 508, and base 513. As shown, rotating part 506 is assembled on top of a thrust disk 924, around which ring 509 of stopping element 508 is positioned. Thrust disk 924 is a form of a rotary bearing that is coupled to base 513. Base 513 and thrust disk 924 may be non-rotatable or stationary components. The friction coefficient between rotating part 506 and thrust disk 924 is configured such that rotating part 506 is able to smoothly rotate or move on top of thrust disk 924. In addition, the friction coefficient between ring 509 and thrust disk 924 is such that ring 509 is able to smoothly rotate around thrust disk 924. As further shown, shaft 516 passes through base 513, stopping element 508, and rotating part 506. In certain embodiments, shaft 516 is stationary. However, in certain other embodiments, shaft 516 is coupled to rotating part 506 and rotates around the same axis (e.g., Z axis shown in FIGS. 5-8).

Although FIGS. 3-9 show a rotational mechanism that allows rotating part 506 to rotate in the opposite direction by 360 degrees from the stowing position, in certain embodiments, by adding one or more additional stopping elements similar to stopping element 508, the rotational range of rotating part 506 may be increased, for example, by multiples of 360 degrees. Also, by reducing the width of the stopping tab 510 of stopping element 508, or by increasing the length of sliding channel 514 of base 513, the rotational range of rotating part 506 may be increased to a value arbitrarily close to 720 degrees, within the limits of practicality.

Figure 10:
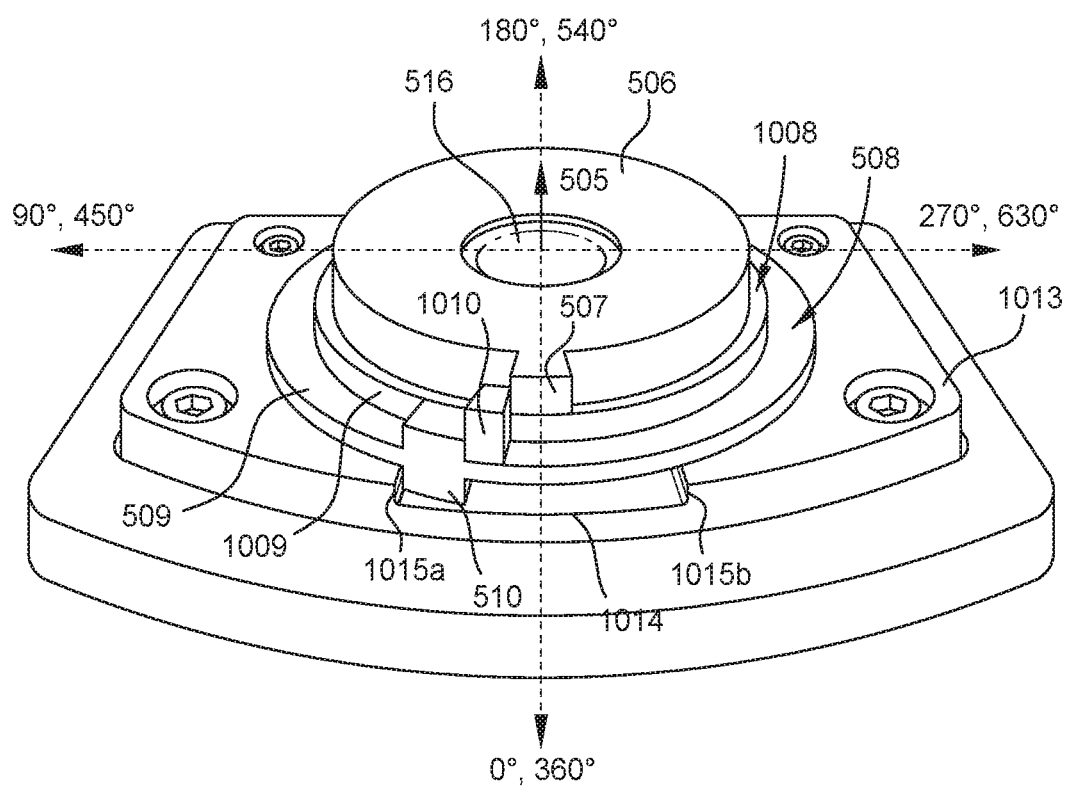
FIG. 10 illustrates a rotational mechanism with an additional stopping element incorporated into the rotational mechanism of FIGS. 5-9, in accordance with certain embodiments.

FIG. 10 illustrates a rotational mechanism with an additional stopping element, shown as stopping element 1008 including a ring 1009 and a stopping tab 1010. Ring 1009 rotates relative to base 1013 and independent of rotating part 506 and ring 509. In the example of FIG. 10, a different base 1013 is used, which provides a wider sliding channel 1014, with barriers 1015a and 1015b. As shown, rotating part 506 is fully rotated in a clockwise direction and is in the stowing position, where stopping tab 510 of stopping element 508 is in contact with or stopped by barrier 1015a. From this position rotating part 506 is able to be rotated in a counterclockwise direction by 720 degrees. More specifically, after rotating part 506 is rotated by 360 degrees in a counterclockwise direction, extension 507 makes contact with stopping tab 1010 of stopping element 1008. Further rotation of rotating part 506 in a counterclockwise direction causes a rotation of stopping tab 1010 in a counterclockwise direction as well. In other words, once extension 507 makes contact with stopping tab 1010, rotating part 506 is able to rotate an additional 360 degrees, at which point stopping tab 1010 is sandwiched between extension 507 and stopping tab 510, which itself is stopped by barrier 1015b. Accordingly, by adding additional stopping elements, the rotational range of rotating part 506 may be adjusted (i.e., increased).

Note that when incorporating additional stopping elements (e.g., stopping element 1008) into the rotational mechanism described herein, in order to ensure a rotating part (e.g., rotating part 506) is placed in the stowing position after a full rotation in either direction, the width of the sliding channel that is provided by the base, the width of the stopping tabs, and/or the width of the extension associated with the rotating may be adjusted. In the example of FIG. 10, the width of sliding channel 1014 was increased as compared to the width of sliding channel 514 to allow for incorporating stopping element 1008. Note that the stowing position may also refer to a frontal plane of a rotating part being set to multiples of 360 degrees plus 180 degrees (e.g., 180, 540, 900, 1260, and so on).

Figure 11:
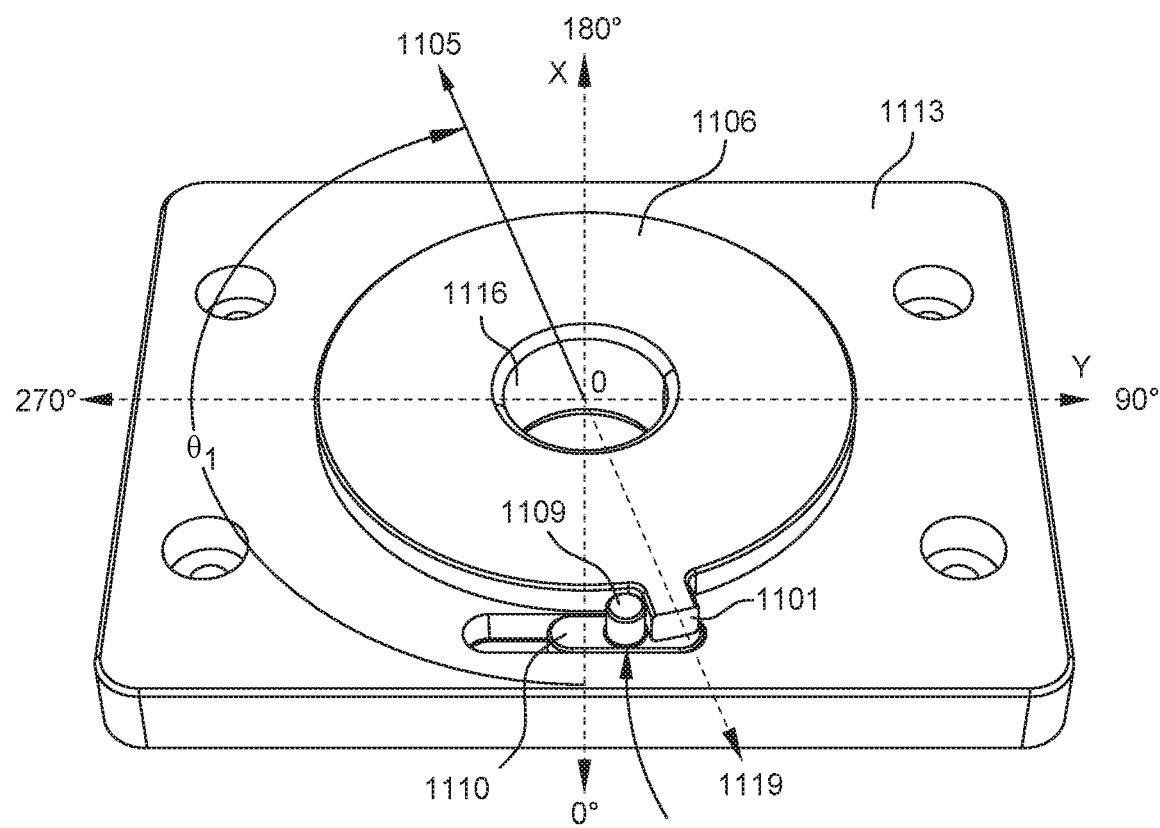
FIG. 11 illustrates an alternative rotational mechanism including a rotating part assembled on top of a base, in accordance with certain embodiments.
Figure 12:
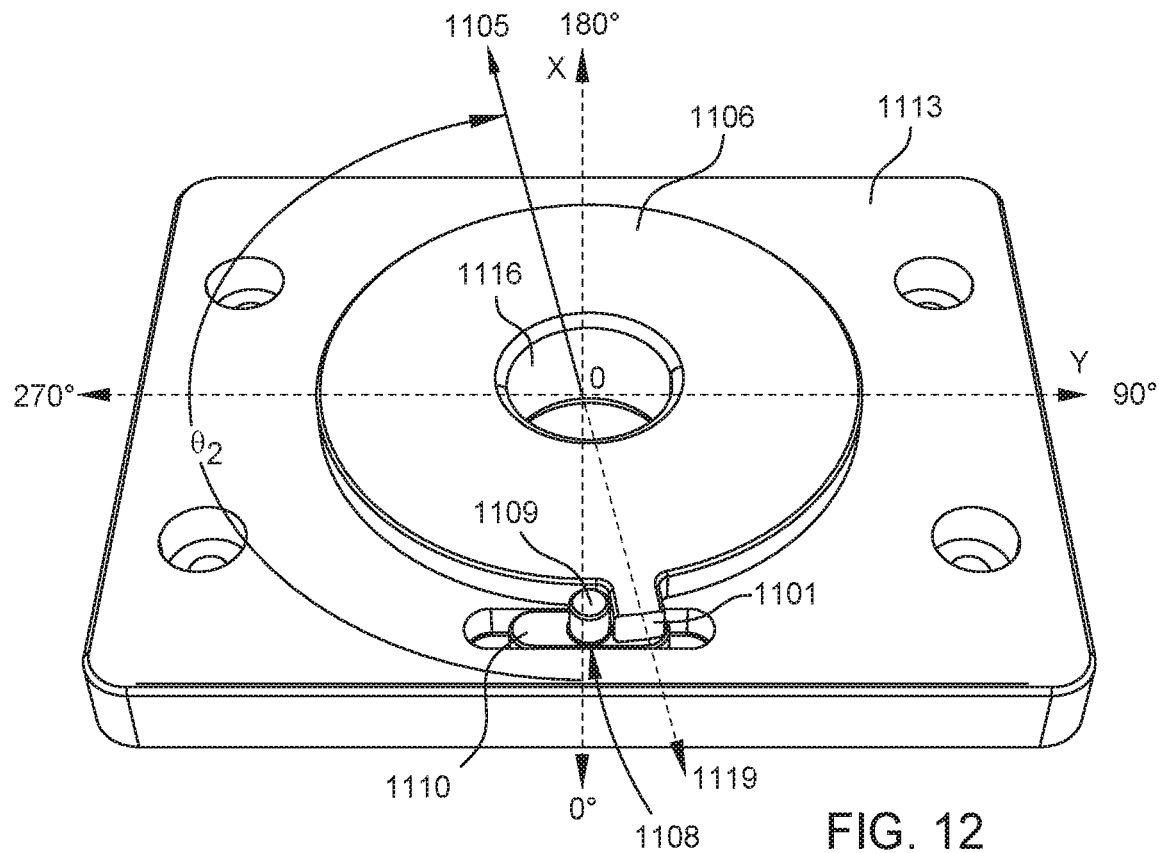
FIG. 12 is illustrative of further rotation of the rotating part and stopping element of FIG. 11.
Figure 13:
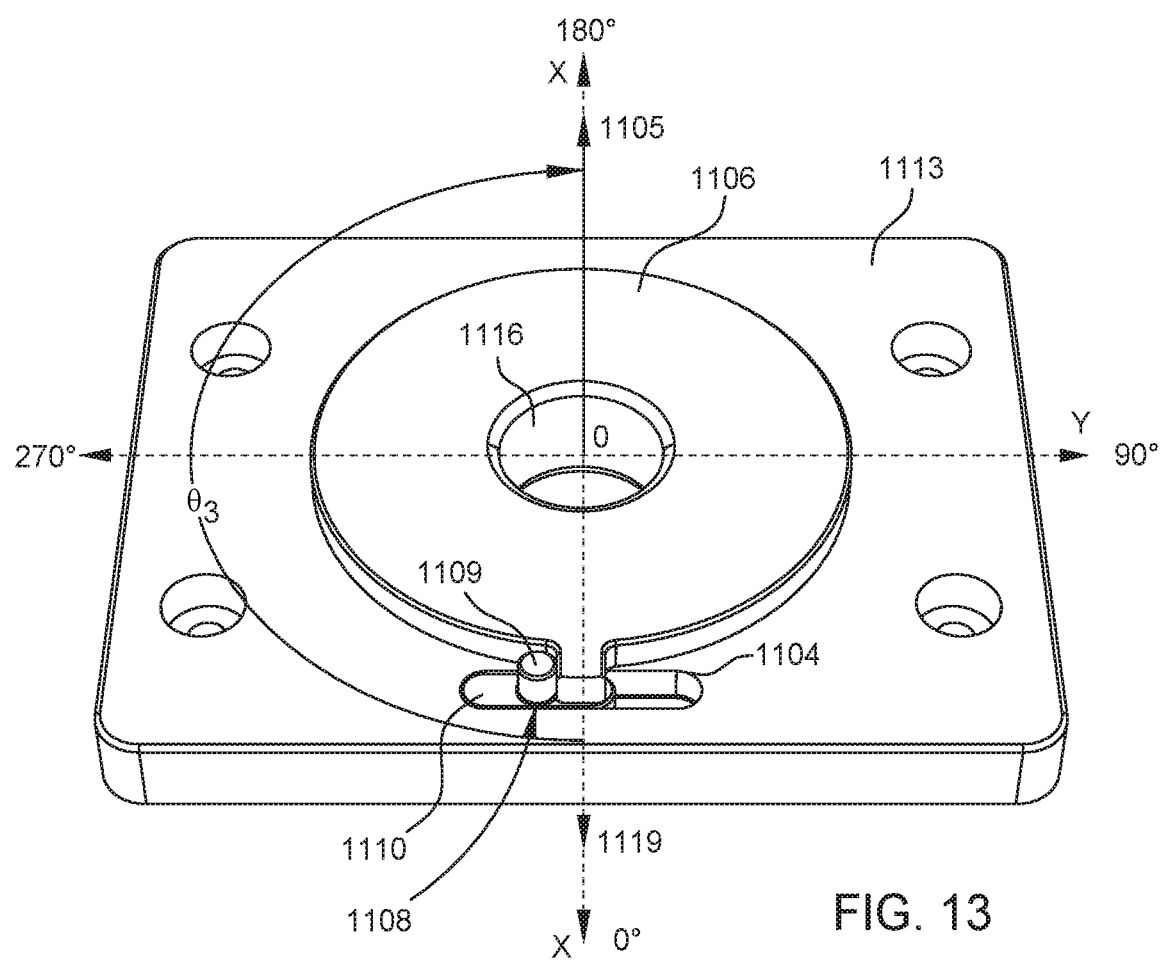
FIG. 13 illustrates the rotating part of FIGS. 11 and 12, at a fully rotated state, in accordance with certain embodiments.

FIGS. 11-13 illustrate an alternative embodiment including components that, similar to the components described in relation to FIGS. 5-8, allow for rotating a rotating part from a starting position by 180 degrees in a bidirectional manner.

FIG. 11 illustrates a rotating part 1106 assembled on top of a base 1113. In one example, a device such as a monitor may be mounted on top of rotating part 1106. Rotating part 1106 comprises a cylindrical hole through which a hollow shaft 1116 is positioned. In cases where a monitor or another electronic device is mounted on rotating part 1106, shaft 1116 may house cables and cords that are coupled to the electronic device. Rotating part 1106 comprises extension 1107, which is similar to extension 507 of FIG. 5. FIG. 11 also shows stopping element 1108, which comprises a slider 1110 and a tab 1109 (shown as a pin 1109) that extends upward from slider 1110. Pin 1109 may also be referred to as a stopping tab.

Stopping element 1108 is configured to slide linearly to the left and right within a linear or slotted sliding channel 1114 that is provided by base 1113. Sliding channel 1114 comprises two ends or barriers 1115a and 1115b for restricting the movement of stopping element 1108 and, thereby, rotating part 1106. Rotating part 1106 has a frontal plane 1104 whose angle of rotation is described as measured with respect to an arrow that is perpendicular to frontal plane 1104 and also parallel and in the opposite direction to where the middle of the tip of extension 1107 is directed to. The angle of rotation of frontal plane 1104 is referred to as $\Theta$, which is measured based on a coordinate system with an origin at the center of rotating part 1106.

Similar to the embodiments described in relation to FIGS. 5-8, the length of sliding channel 1114, the width of pin 1109, and the width of extension 1107 are configured such that when rotating part 1106 is fully rotated in a clockwise manner and pin 1109 of stopping element 1108 makes contact with barrier 1115a, frontal plane 1104 of rotating part 1106 is at 180 degrees from the starting position. In the example of FIG. 11, frontal plane 1104 is at $\Theta_1$, which is less than 180 degrees, measured from the starting position.

FIG. 12 is illustrative of further rotation of rotating part 1106 and stopping element 1108 in a clockwise manner. As shown, frontal plane 1104 is at $\Theta_2$, which is less than 180 degrees, measured from the starting position.

FIG. 13 illustrates rotating part 1106, which is fully rotated in a clockwise direction. More specifically, FIG. 12 shows rotating part 1106 fully rotated in a clockwise manner and positioned at $\Theta_3$, which equals to 180 degrees measured from the starting position.

Note that although the rotational mechanism described in relation to FIGS. 3A-8 and 11-13 limit the rotation of a rotating part to 180 degrees from a staring position in each direction, in certain other embodiments, the rotation of the rotating part may be limited by less than 180 degrees. For example, in one example, the rotating part may be rotated in both directions by 150 degrees from the starting position, at which point, for example, a monitor coupled to the rotating part may be put in a stowing position and any further rotation of the rotating part in the same direction may be limited.

Also, note that in FIGS. 11-13 the frontal plane of rotating part 1106 is in the opposite direction of where extension 1107 is directed to. More specifically, frontal plane arrow 1105 is parallel to but in the opposite direction of extension arrow 1119. However, in some other embodiments, frontal plane of rotating part 1106 is oriented in the same direction as where extension 1107 is directed to. More specifically, in such embodiments, frontal plane arrow 1105 is parallel to and unidirectional with extension arrow 1119, such that there is a 0 degree difference between frontal plane arrow 1105 and extension arrow 1119. In such embodiments, in the stowing position, both frontal plane arrow 1105 and extension arrow 1119 are set to 0 degrees about the Z axis (0 degrees on the X axis) while in the starting position, both frontal plane arrow 1105 and extension arrow 1119 are set to 180 degrees about the Z axis (180 degrees on the X axis). In the embodiments of FIGS. 11-13, rotating part 1106 is placed in a stowing or stopping position when the middle of the tip of extension 1107 is aligned with the middle of sliding channel 1114, as shown in FIG. 13, such that rotating part 1106 is restricted from further rotating in the same direction it has been rotating in order to reach the stopping position.

In some other embodiments, frontal plan arrow 1105 may make angles other than 0 or 180 degrees with extension arrow 1119. For example, frontal plane arrow 1105 may be perpendicular to extension arrow 1119.

The foregoing description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

What is claimed is:

1. A rotational mechanism comprising:
    a rotating part configured to rotate about a first axis, the rotating part comprising an extension;
    a base comprising a sliding channel, wherein the rotating part is configured to rotate with respect to the base; and
    a stopping element comprising a stopping tab configured to move within and interact with the sliding channel and further configured to interact with the extension to limit rotation of the rotating part, wherein:
        the sliding channel comprises a first barrier and a second barrier,
        the first barrier restricts movement of the stopping element in a first direction based on interaction between the first barrier and the stopping tab,
        the second barrier restricts movement of the stopping element in a second direction based on interaction between the second barrier and the stopping tab,
        the rotating part is able to rotate the same amount in both the first direction and the second direction starting from a starting position and stopping at a stopping position, wherein, when reaching the stopping position by rotation in the first direction, the rotating part is restricted from further moving in the first direction, and wherein, when reaching the stopping position by rotation in the second direction, the rotating part is restricted from further moving in the second direction;
    wherein:
    the stopping element comprises a ring comprising the stopping tab, and
    the ring is configured to rotate about the first axis with respect to the base and independent of the rotating part.

2. The rotational mechanism of claim 1, further comprising:
    a second stopping element comprising a second stopping tab configured to interact with the extension and the stopping tab, wherein:
        the second stopping element comprises a second ring comprising the second stopping tab, and
        the second ring is configured to rotate about the first axis with respect to the base and independent of the rotating part and the ring.

3. The rotational mechanism of claim 2, wherein at a first full rotation of the rotating part in the first direction:
    the stopping tab is in contact with the first barrier,
    the second stopping tab is in contact with the stopping tab,
    the extension is in contact with the second stopping tab,
    the stopping tab is positioned between the second stopping tab and the first barrier, and
    the second stopping tab is positioned between the stopping tab and the extension.

4. The rotational mechanism of claim 3, wherein at a second full rotation of the rotating part in the second direction:
    the stopping tab is in contact with the second barrier,
    the second stopping tab is in contact with the stopping tab,
    the extension is in contact with the second stopping tab,
    the stopping tab is positioned between the second stopping tab and the second barrier, and
    the second stopping tab is positioned between the stopping tab and the extension.

5. The rotational mechanism of claim 1, wherein the amount corresponds to a 180 degree rotation.

6. A rotational mechanism comprising:
    a rotating part configured to rotate about a first axis, the rotating part comprising an extension;
    a base comprising a sliding channel, wherein the rotating part is configured to rotate with respect to the base; and
    a stopping element comprising a stopping tab configured to move within and interact with the sliding channel and further configured to interact with the extension to limit rotation of the rotating part, wherein:

the sliding channel comprises a first barrier and a second barrier,
the first barrier restricts movement of the stopping element in a first direction based on interaction between the first barrier and the stopping tab,
the second barrier restricts movement of the stopping element in a second direction based on interaction between the second barrier and the stopping tab,
the rotating part is able to rotate the same amount in both the first direction and the second direction starting from a starting position and stopping at a stopping position, wherein, when reaching the stopping position by rotation in the first direction, the rotating part is restricted from further moving in the first direction, and wherein, when reaching the stopping position by rotation in the second direction, the rotating part is restricted from further moving in the second direction;
wherein at a first full rotation of the rotating part in the first direction the stopping tab is in contact with the first barrier and the extension is in contact with the stopping tab and the stopping tab is positioned between the extension and the first barrier.

7. The rotational mechanism of claim 6, wherein at a second full rotation of the rotating part in the second direction the stopping tab is in contact with the second barrier and the extension is in contact with the stopping tab and the stopping tab is positioned between the extension and the second barrier.

8. A rotational mechanism comprising:
a rotating part configured to rotate about a first axis, the rotating part comprising an extension;
a base comprising a sliding channel, wherein the rotating part is configured to rotate with respect to the base; and
a stopping element comprising a stopping tab configured to move within and interact with the sliding channel and further configured to interact with the extension to limit rotation of the rotating part, wherein:
the sliding channel comprises a first barrier and a second barrier,
the first barrier restricts movement of the stopping element in a first direction based on interaction between the first barrier and the stopping tab,
the second barrier restricts movement of the stopping element in a second direction based on interaction between the second barrier and the stopping tab,
the rotating part is able to rotate the same amount in both the first direction and the second direction starting from a starting position and stopping at a stopping position, wherein, when reaching the stopping position by rotation in the first direction, the rotating part is restricted from further moving in the first direction, and wherein, when reaching the stopping position by rotation in the second direction, the rotating part is restricted from further moving in the second direction;
wherein:
the stopping element comprises a slider comprising the stopping tab, and
the slider is configured to move linearly within the sliding channel.

9. A surgical console, comprising:
a display monitor;
a rotating part configured to rotate about a first axis, the rotating part comprising an extension, wherein the display monitor is coupled to the rotating part;
a base comprising a sliding channel, wherein the rotating part is configured to rotate with respect to the base; and
a stopping element comprising a stopping tab configured to move within and interact with the sliding channel and further configured to interact with the extension to limit rotation of the rotating part, wherein:
the sliding channel comprises a first barrier and a second barrier,
the first barrier restricts movement of the stopping element in a first direction based on interaction between the first barrier and the stopping tab,
the second barrier restricts movement of the stopping element in a second direction based on interaction between the second barrier and the stopping tab,
the rotating part is able to rotate the same amount in both the first direction and the second direction starting from a starting position and stopping at a stopping position, wherein, when reaching the stopping position by rotation in the first direction, the rotating part is restricted from further moving in the first direction, and wherein, when reaching the stopping position by rotation in the second direction, the rotating part is restricted from further moving in the second direction;
wherein:
the stopping element comprises a ring comprising the stopping tab, and
the ring is configured to rotate about the first axis with respect to the base and independent of the rotating part.

10. The surgical console of claim 9, further comprising:
a second stopping element comprising a second stopping tab configured to interact with the extension and the stopping tab, wherein:
the second stopping element comprises a second ring comprising the second stopping tab, and
the second ring is configured to rotate about the first axis with respect to the base and independent of the rotating part and the ring.

11. The surgical console of claim 10, wherein at a first full rotation of the rotating part in the first direction:
the stopping tab is in contact with the first barrier,
the second stopping tab is in contact with the stopping tab,
the extension is in contact with the second stopping tab,
the stopping tab is positioned between the second stopping tab and the first barrier, and
the second stopping tab is positioned between the stopping tab and the extension.

12. The surgical console of claim 11, wherein at a second full rotation of the rotating part in the second direction:
the stopping tab is in contact with the second barrier,
the second stopping tab is in contact with the stopping tab,
the extension is in contact with the second stopping tab,
the stopping tab is positioned between the second stopping tab and the second barrier, and
the second stopping tab is positioned between the stopping tab and the extension.

13. The surgical console of claim 9, wherein the amount corresponds to a 180 degree rotation.

14. The surgical console of claim 9, wherein the display monitor is configured to be stowed when the rotating part is in the stopping position.

15. A surgical console, comprising:
a display monitor;
a rotating part configured to rotate about a first axis, the rotating part comprising an extension, wherein the display monitor is coupled to the rotating part;
a base comprising a sliding channel, wherein the rotating part is configured to rotate with respect to the base; and a stopping element comprising a stopping tab configured to move within and interact with the sliding channel and further configured to interact with the extension to limit rotation of the rotating part, wherein:
  the sliding channel comprises a first barrier and a second barrier,
  the first barrier restricts movement of the stopping element in a first direction based on interaction between the first barrier and the stopping tab,
  the second barrier restricts movement of the stopping element in a second direction based on interaction between the second barrier and the stopping tab,
  the rotating part is able to rotate the same amount in both the first direction and the second direction starting from a starting position and stopping at a stopping position, wherein, when reaching the stopping position by rotation in the first direction, the rotating part is restricted from further moving in the first direction, and wherein, when reaching the stopping position by rotation in the second direction, the rotating part is restricted from further moving in the second direction;
  wherein at a first full rotation of the rotating part in the first direction the stopping tab is in contact with the first barrier and the extension is in contact with the stopping tab and the stopping tab is positioned between the extension and the first barrier.

16. The surgical console of claim 15, wherein at a second full rotation of the rotating part in the second direction the stopping tab is in contact with the second barrier and the extension is in contact with the stopping tab and the stopping tab is positioned between the extension and the second barrier.

17. A surgical console, comprising:
a display monitor;
a rotating part configured to rotate about a first axis, the rotating part comprising an extension, wherein the display monitor is coupled to the rotating part;
a base comprising a sliding channel, wherein the rotating part is configured to rotate with respect to the base; and
a stopping element comprising a stopping tab configured to move within and interact with the sliding channel and further configured to interact with the extension to limit rotation of the rotating part, wherein:
  the sliding channel comprises a first barrier and a second barrier,
  the first barrier restricts movement of the stopping element in a first direction based on interaction between the first barrier and the stopping tab,
  the second barrier restricts movement of the stopping element in a second direction based on interaction between the second barrier and the stopping tab,
  the rotating part is able to rotate the same amount in both the first direction and the second direction starting from a starting position and stopping at a stopping position, wherein, when reaching the stopping position by rotation in the first direction, the rotating part is restricted from further moving in the first direction, and wherein, when reaching the stopping position by rotation in the second direction, the rotating part is restricted from further moving in the second direction;
wherein:
  the stopping element comprises a slider comprising the stopping tab, and
  the slider is configured to move linearly within the sliding channel.

* * * * *